United States Patent [19]

Geist

[11] Patent Number: 5,047,629
[45] Date of Patent: Sep. 10, 1991

[54] POSITION AND MOTION DETECTOR WITH MAGNETIC COUPLING AND OPTICAL DETECTION

[75] Inventor: Henry E. Geist, Scottsdale, Ariz.

[73] Assignee: Motorola, Inc., Schaumburg, Ill.

[21] Appl. No.: 502,702

[22] Filed: Mar. 30, 1990

[51] Int. Cl.⁵ .............................................. G01D 5/34
[52] U.S. Cl. ............................ 250/231.1; 250/231.13
[58] Field of Search ................... 250/231.10, 231.11, 250/231.13; 73/861.77; 464/29

[56] References Cited

U.S. PATENT DOCUMENTS

| | | |
|---|---|---|
| 3,892,961 | 7/1975 | Bachmann .................... 250/211 K |
| 4,296,410 | 10/1981 | Higgs et al. . |
| 4,356,397 | 10/1982 | Lenderring et al. ........... 250/231.13 |
| 4,403,144 | 9/1983 | Strahan et al. .................... 250/231.1 |
| 4,448,555 | 5/1984 | Hasegawa . |
| 4,459,759 | 7/1984 | Hulsing . |
| 4,536,708 | 8/1985 | Schneider . |
| 4,590,425 | 5/1986 | Schonstedt . |
| 4,674,767 | 6/1987 | Koroki et al. . |
| 4,676,097 | 6/1987 | Tusting . |
| 4,746,791 | 5/1988 | Forkel .......................... 250/231.13 |
| 4,796,966 | 1/1989 | Koveleski et al. ............. 250/231.1 |
| 4,843,886 | 7/1989 | Koppers . |
| 4,887,583 | 12/1989 | Lin . |

Primary Examiner—David C. Nelms
Attorney, Agent, or Firm—Robert M. Handy; Eugene A. Parsons

[57] ABSTRACT

The position, velocity and/or acceleration of one portion (22A) of an apparatus relative to another portion (20) of the apparatus is measured with a hermetically enclosed sensor (100) having therein, a moveable armature (104) magnetically coupled to the apparatus through a wall (108) of the hermetic enclosure (102) so as to move in a predetermined direction (116) in response to relative motion (30) of the apparatus, combined with an optical detector (110, 112, 114) extending within the same hermetic enclosure (102) for measuring the position and/or motion (116) of the magnetically coupled armature (104) responding to the relative motion (30) of the apparatus.

9 Claims, 2 Drawing Sheets

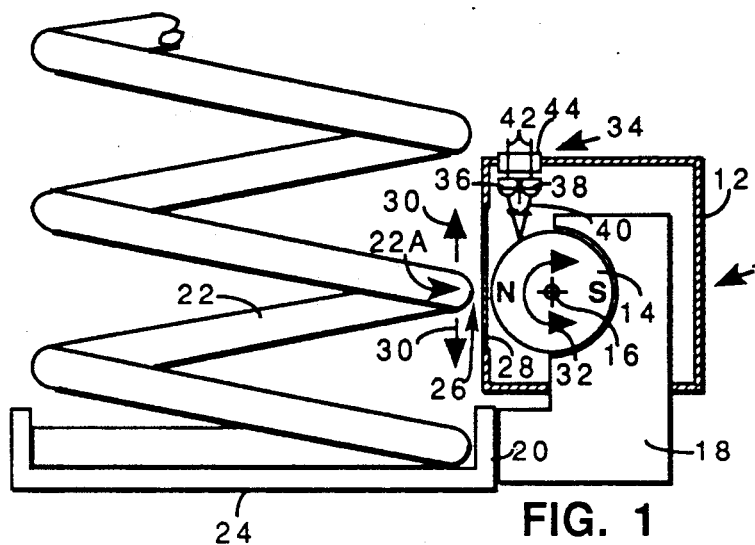
FIG. 1
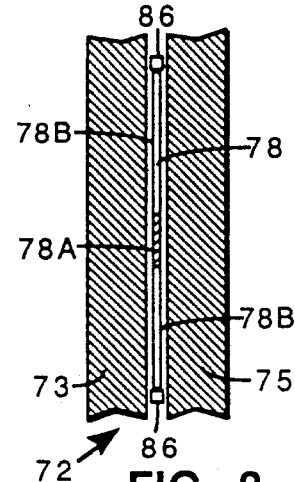
FIG. 3
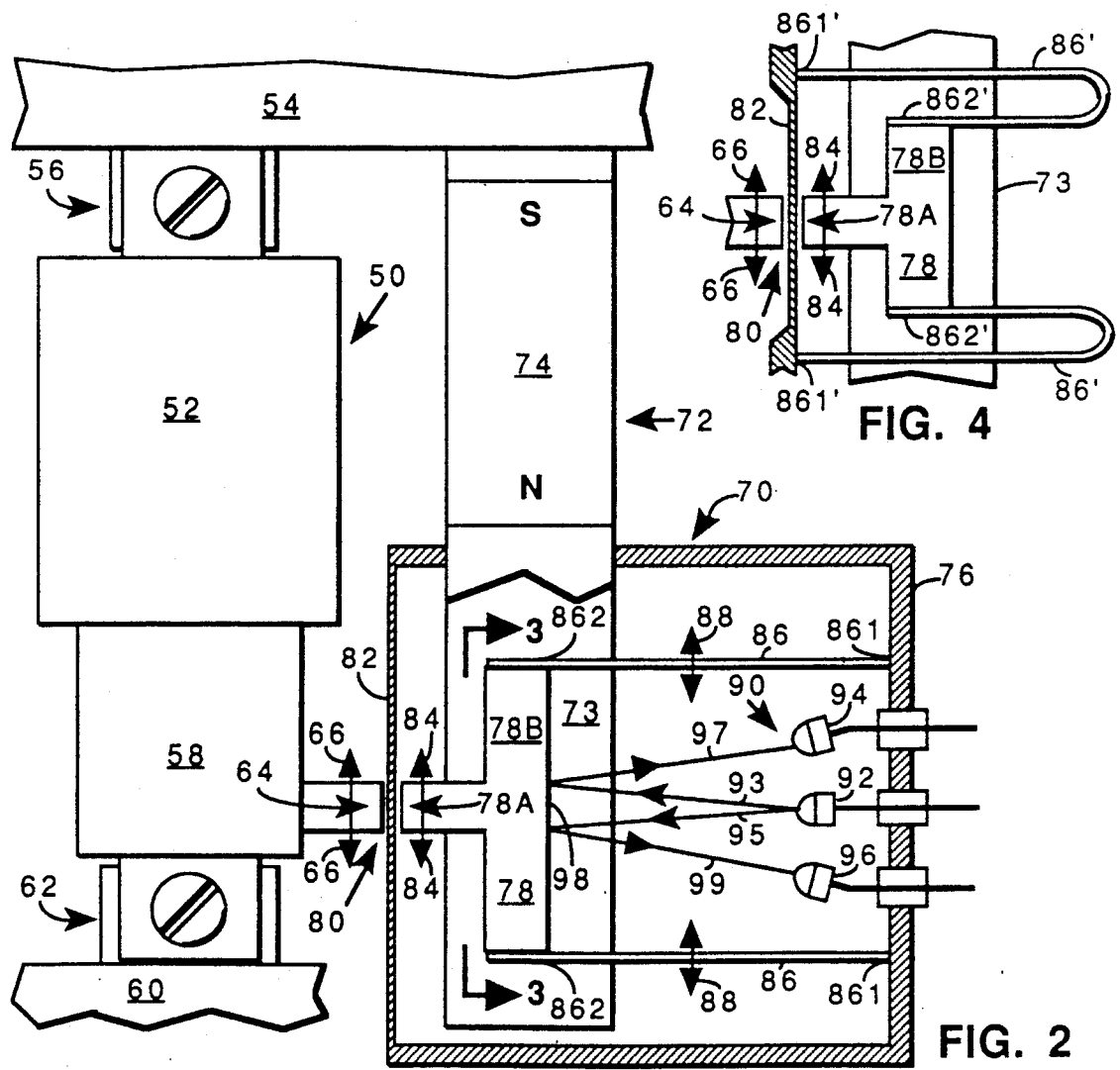
FIG. 2 / FIG. 4

POSITION AND MOTION DETECTOR WITH MAGNETIC COUPLING AND OPTICAL DETECTION

FIELD OF THE INVENTION

The present invention relates to position and motion detectors and, more particularly, hermetically enclosed position and motion detectors wherein position and/or motion can be measured without exposing any critical measuring components to dust, dirt, moisture and other ambient contaminants.

BACKGROUND OF THE INVENTION

There is a long standing need for improved systems for measuring the position and motion of one object relative to another or one part of an apparatus relative to another. For example, modern active automotive suspension systems require some means for detecting the relative position and motion, e.g. height, velocity and acceleration, of the vehicle running gear (wheels, axles, etc.) with respect to the vehicle frame as the vehicle travels. This has historically been done, for example, by attaching the case of a potentiometer to the running gear and the wiper arm to the vehicle frame or vice versa. From this an electrical signal may be derived whose magnitude is proportional to the instantaneous relative position of the running gear and the frame. By differentiating the signal, the velocity and acceleration of the running gear relative to the frame may also be determined. Ultrasonic detectors which measure the height of the vehicle frame or body above the road have also been used for the same purpose.

A common difficulty with these position and/or motion detectors is that they are difficult to protect from the adverse ambient in which they must function. When used on vehicles, for examples, they are exposed to dirt, dust, moisture, salt and many other highly corrosive or damaging ambients. Many of the prior art sensors are not hermetic, e.g., they have moving seals which tend to wear out or suffer from other limitations well known in the art. Thus, a need continues to exist for improved position/motion sensors, especially for sensors which are hermetic, i.e., easily rendered substantially impervious to dirt, dust, moisture and the like.

SUMMARY OF THE INVENTION

It is an object of the present invention to provide an improved position/motion sensor which is hermetically sealed and which does not require moving parts penetrating the wall of the hermetic enclosure. It is a further object to provide an improved position/motion sensor which employs magnetic coupling through a wall of the hermetic enclosure and electrical-optical readout for convenience of utilizing the detected position/motion information.

These and other objects and advantages are realized through a sensor for detecting position and/or relative motion, comprising, coupling means, e.g., a movable magnetic armature, which is coupled to the object whose motion is to be detected by magnetic lines of force. The armature moves in sympathy to motion of the object. Optical detection means are provided for measuring the position and/or change in position of the coupling means. The coupling means and at least part of the optical detection means are contained within a hermetic enclosure and the magnetic lines of force pass through one or more walls of the enclosure.

The portion of the enclosure through which the magnetic lines of force pass is desirably non-ferromagnetic. The object and the coupling means comprise ferromagnetic materials and a magnetic field must extend between the coupling means and some portion of the object whose motion is being measured or an attachment to the object.

The optical detection means may work by reflection or transmission or both, and may be totally or partially within the hermetic enclosure. In a preferred embodiment, at least one optical emitter and one or more receivers are provided. The emitter illuminates a reflective or transmissive scale attached to the magnetically coupled, moveable armature. Motion of the armature and its related scale modulates the optical signal reaching the receivers. The scale may have continuously variable reflectivity or transmissivity, in which case an analog output is obtained, or may comprise successive regions of substantial contrast so that a digitized or quantized readout is obtained. Either will serve.

The output of the optical receiver(s) is an electrical signal which is easily used for further information processing using means well known in the art. The receiver(s) are mounted either inside the hermetic enclosure, in which case the electrical signal is brought out through hermetic feed throughs, or outside the hermetic enclosure, in which case the optical signal is brought out through a window sealed in a wall of the hermetic enclosure.

The moveable armature is conveniently suspended within the hermetic enclosure so that it may move with little or no friction in sympathy to the movement of the object whose position or motion is being detected, being coupled thereto by magnetic forces. The armature may be floated on a high density fluid, held by springs, or suspended from an axle or torsion fibre, or by other means.

The above-summarized invention will be more fully appreciated by reference to the accompanying drawings and the explanation thereof which follows.

BRIEF DESCRIPTION OF THE DRAWINGS

FIG. 1 is a side and partial cut-away view of a position/motion sensor according to a first embodiment of the present invention;

FIG. 2 is a side and partial cut-away view of a position/motion sensor according to a another embodiment of the present invention;

FIG. 3 is a cross-sectional and cut-away view of a portion of the sensor of FIG. 2 at the indicated location;

FIG. 4 is a partial cut-away side view of a portion of the sensor of FIG. 2 showing a further embodiment;

DETAILED DESCRIPTION OF THE DRAWINGS

Figure 5:
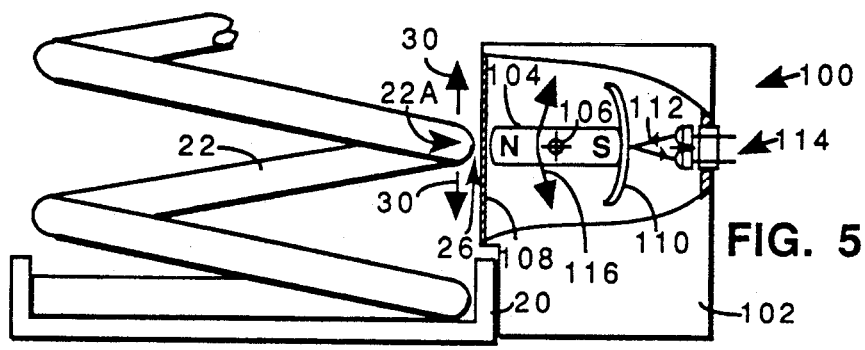
FIG. 5 is a side and partial cut-away view of a position/motion sensor according to a further embodiment of the present invention.

FIG. 1 shows a side and partial cut-away view of a first embodiment of the sensor of the present invention as applied to a spring, as for example a vehicle spring, to detect motion of one end of the spring relative to the other end of the spring. The spring is coupled, for example, between the axle and frame or body of a vehicle. As spring 22 compresses or extends, portion 22A of spring 22 will move relative to spring support base 20.

While FIG. 1 (and FIGS. 5-6) illustrate detecting relative motion of a portion of a vehicle spring, this is intended merely for convenience of explanation and not limitation. Those of skill in the art will understand based on the description herein that relative motion of any object may be detected by the means and method described herein provided that a ferromagnetic portion of the object or a ferromagnetic attachment thereto can be brought into close proximity to the invented motion sensor.

Sensor 10 comprises hermetic enclosure 12 within which magnetic armature 14 is rotatably mounted on axle 16. Armature 14 may be permanently magnetized as indicated by the "N"/"S" designations thereon in FIG. 1, or the magnetic flux may be provided by a permanent magnet or coil elsewhere in the magnetic circuit of which armature 14 is but a part. Where the magnet or coil is elsewhere, it is desirable that the portion of armature 16 facing spring 22 not be perfectly cylindrical but taper or have a protrusion facing toward spring portion 22A so as to concentrate the magnetic flux in its vicinity.

While armature 14 is shown as having a cylindrical shape, this is not essential and many other armature shapes will also serve. For example, armature 14 may be a bar magnet with poles located at the "N" and "S" positions indicated on FIG. 1, or a ferromagnetic bar with poles induced by a magnet located elsewhere. The designations "N" and "S" in FIG. 1 and elsewhere herein are intended merely to be exemplary and magnetic polarity may be reversed.

In the embodiment of FIG. 1, magnetic stator 18 is provided separated by a small gap from armature 16. Stator 18 extends to base 20 of spring 22. Lower face 24 of spring base 20 is coupled to one part of the vehicle, e.g., the axle, and the other end of spring 22 is connected to the frame or body (not shown) of the vehicle. Sensor 10 is arranged so that when spring 22 is in its normal rest position, one coil (or a protrusion attached to spring 22 or base 20) is opposite armature 14 and separated therefrom by small air-gap 26 and wall 28 of enclosure 12. It is desirable that the magnetic circuit comprising armature 14, stator 18, base 20 and spring 22, 22A be of ferromagnetic material since this provides the strongest magnetic field across gap 26. A source of magnetic field must exist somewhere in this magnetic circuit so as to generate the magnetic lines of force across gap 26. Either a permanent magnet or a coil may be used as the source of magnetic field.

As spring 22 is compressed and stretched by motion of the vehicle over the road or in response to changes in loading, portion 22A moves up and down relative to base 20, as indicated by arrows 30. As a result of the magnetic field extending between spring portion 22A and armature 14 across gap 26 and through wall 28, armature 14 rotates, as shown by arrows 32, in sympathy to spring motion 30. For small movements of portion 22A, armature rotation 32 is approximately linearly related to motion 30. For larger extensions and contractions of spring 22, rotation 32 of armature 14 continues, but is not necessarily a linear function of motion 30. However, the amount of rotation 32 obtained for a given amount of spring deflection is easily calculated or measured or both by those of skill in the art for any given armature-spring arrangement so that the relationship between deflection 30 and armature rotation 32 is readily determinable. In summary, armature rotation 32 is proportional in some readily determinable way to motion 30 of spring portion 22A (or some other moving object), which in turn is related in a determinable way to the relative position and motion of the vehicle frame/body at one end of the spring and the axle at the other end of the spring.

Figure 7:
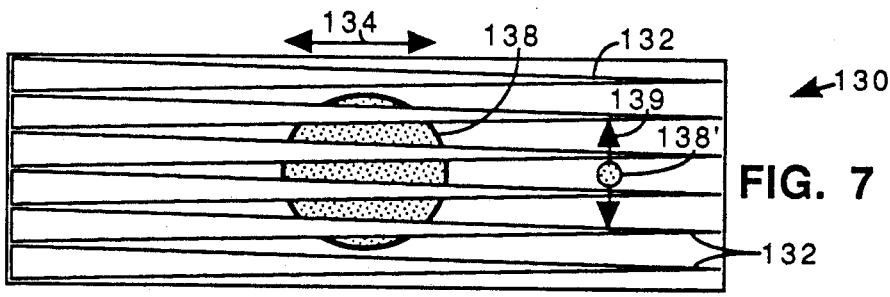
FIG. 7 is a simplified drawing of an optical scale, according to a first embodiment thereof, suitable for use in connection with the apparatus of FIG. 1-6, either in transmission or reflection, to extract position and motion information from the armature by means of one or more light beams impinging thereon.
Figure 8:
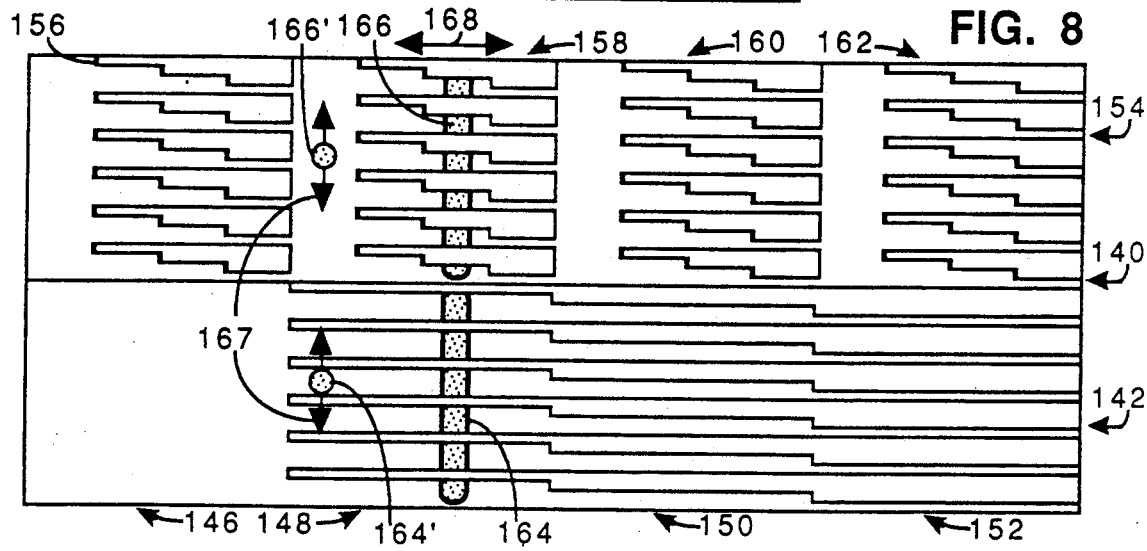
FIG. 8 is a simplified drawing of an optical scale, according to a further embodiment thereof, suitable for use in connection with the apparatus of FIG. 1-6, either in transmission or reflection, to extract position and motion information from the armature by means of one or more light beams impinging thereon.

The position and motion of armature 14 is measured by optical sensor means 34 comprising optical emitter 36 and optical receiver 38 with light beam 40 extending, in this embodiment, from emitter 36 to armature 14 and back to receiver 38. An optical scale having a region of varying optical reflectivity or transmissivity (e.g., the light beam is modulated) and/or reflection or refraction (e.g. the light beam is deflected or bent) is provided on armature 14 so that the amount of light and/or the modulation frequency of the light reaching receiver 38 varies with the position of armature 14. Examples of suitable optical scales are shown in FIGS. 7-8. Other optical scales or read-out means may also be used.

Optical sensor 34 has electrical leads 42 extending through hermetic seal 44 in the side of enclosure 12. Means for providing such hermetic electrical seals are well known in the art. Alternatively, all or part of sensor 34 may be mounted outside enclosure 12 and some part of light beam 40 passed through a transparent window sealed in the wall of enclosure 12. Means for providing such sealed windows are well known in the art.

While sensor 10 has been described as being mounted in proximity to a spring and in which the spring forms part of the magnetic circuit associated with sensor 10, this is not essential. Sensor 10 can be mounted in proximity to any portion of the vehicle which moves in relation to the sensor. It is desirable but not essential that a low impedance magnetic circuit be provided between armature 14 and the portion of the object whose motion is being detected across air gap 26 since this improves the sensitivity of the overall motion detection system.

FIG. 2 shows a side and partial cut-away view of another embodiment of the present invention in which, by way of example, the position and motion of the bottom part of a vehicle shock absorber is being measured relative to the top part of the shock absorber. Generally the top of the shock absorber is coupled to the vehicle frame or body and the bottom part to the vehicle axle. The manner of connection of the shock absorber to the frame or axle is conventional. FIG. 2 illustrates the situation in which a closed magnetic circuit is provided through the shock absorber, but this is not essential.

Shock absorber 50 of conventional construction has upper portion 52 coupled to vehicle frame or body 54 by attachment means 56, as for example, by a bolt passing through one or more extensions. Lower portion 58 of shock absorber 50 is coupled to axle 60 by attachment means 62. Attached to portion 58 is extension 64. As axle 60 rises and falls relative to frame 54, portion 64 also rises and falls relative to frame 54, as indicated by motion arrows Motion sensor 70 is provided attached to frame or body 66.

Motion sensor 70 is provided attached to frame or body by stator 72. Stator 72 conveniently contains source 74 of magnetic field, e.g., a permanent magnetic, but this is not essential. The magnet may be located, for example, in armature 78. The magnetic orientations "N" and "S" are merely for illustration and may be reversed. Stator 72 extends from frame 54 into hermetic enclosure 76. Within enclosure 76, stator 72 is split into two closely spaced portions 73 and 75 on either side of moveable armature 78. Further details of this arrangement are shown in FIG. 3 which is a cross-section of the stator and armature at the location indicated in FIG. 2. Stator 72 has spaced-apart portions 73, 75 and armature 78 is mounted in the resulting narrow slot within stator 72. Armature 78 has broad faces 78B parallel to the walls of the slot and covering a substantial area thereof. This aids in reducing the magnetic impedance between stator 72 and armature 78. It is desirable to minimize the impedance in the magnetic circuit from armature 78 through stator 72, vehicle frame 54, shock attachment means 56, shock absorber 50, shock absorber extension 64 and across gap 80 to armature extension 78A and back to armature 78 so that the magnetic field in gap 80 between portion 78A of armature 78 and shock absorber extension 64 is maximized. This increases the magnetic force between extension 64 and armature 78.

Armature 78 has portion 78A which extends toward shock absorber extension 64, being separated therefrom by narrow gap 80 and wall 82 of hermetic enclosure 76. When absorber shock portion 58 and extension 64 move as indicated by motion arrows 66, armature 78 movies in sympathy thereto, as indicated by motion arrows 84, by virtue of the magnetic lines of force extending from armature portion 78A to extension 64.

Armature 78 is conveniently supported by leaf springs, although other springs or suspension means could also be used. In the embodiment shown in FIGS. 2-3, first ends 861 of leaf springs 86 are fixed to the wall of enclosure 76 and second ends 862 are attached to armature 78. As armature 78 moves in directions 84, springs 86 deflect as shown by motion arrows 88. FIG. 4 shows a further variation of an armature-spring arrangement in which leaf springs 86' are folded back and attach to the opposite wall of enclosure 76 at 861' (e.g., the wall closest to shock 50) and to armature 78 at 862'. This arrangement increases the allowable travel of armature 78 since, for the same size enclosure, the effective length of leaf springs 86' of FIG. 4 is greater than for leaf springs 86 of FIG. 2. However, either arrangement will suffice. The arrangement of FIGS. 2-4 has the advantage over the arrangement of FIG. 1, in that the motion of armature 78 in sympathy to the motion of axle 60 (via extension 64) is substantially linear over a larger range of motion and, overall, a greater range of motion may be measured. The relationship between motion 66 and motion 84 may be readily determined by calculation or measurement.

The position and motion of armature 78 is detected by an optical measuring system, comprising in this embodiment, optical emitter 92 and optical receivers 94, 96. Emitter 92 provides light beams 93, 95 directed toward armature 78 having reflective scale 98 thereon which produces reflected beams 97, 99 returning respectively to optical receivers 94, 96. Electrical leads for emitter 92 and receivers 94, 96 pass through hermetic lead seals mounted in the wall of enclosure 76. Means for providing such hermetic lead seals is well known in the art.

Optical scale 98 desirably varies along armature 78. In this way, the position of armature 78 and/or changes in position of armature 78 may be determined by the relative strength or repetition rate of the signals at receivers 94, 96. Further, by differentiating one or both received signals a first time, velocity information may be extracted and by differentiating a second time, acceleration information may be extracted. While the arrangement of sensor 70 shows use of one emitter and two receivers, which arrangement is preferred, other arrangements, as for example but not limited to, one or more emitters and two or more receivers, may also be used.

The desirability of having a low impedance magnetic path in connection with the movable armature has been pointed out above in connection with the discussion of FIGS. 1-4. Thus, the components or elements in the magnetic circuit should be of relatively high magnetic permeability material in so far as possible, e.g., ferromagnetic materials, and only those gaps which are essential should be included, as for example, between the armature and the moving object and between the moving armature and the magnetic stator. Other magnetic gaps should be avoided if possible. Use of the magnetic stator is desirable but not essential, as is explained in connection with FIGS. 5-6.

Figure 6:
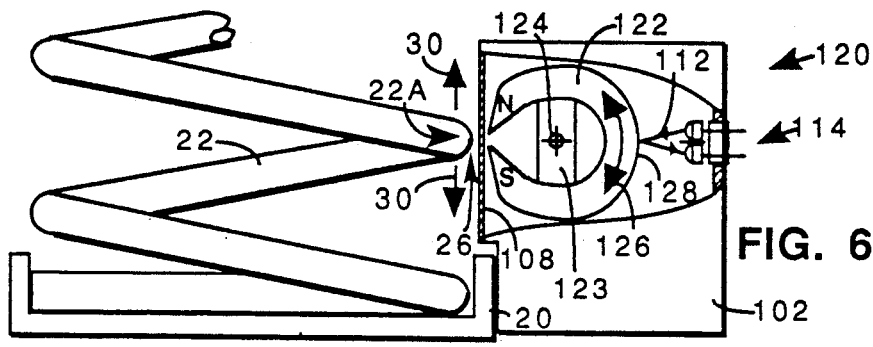
FIG. 6 is a side and partial cut-away view of a position/motion sensor according to a still further embodiment of the present invention.

FIGS. 5-6 are partially cut-away side views of further embodiments of the present invention. Referring now to FIG. 5, spring 22 with portion 22A moving as shown by arrows 30, and base 20 is similar to that shown in FIG. 1. Sensor 100 has hermetic enclosure 102 within which magnet 104 is pivotally mounted on axle or fibre 106. One end of magnet 104 is adjacent wall 108 which is separated from spring portion 22A by small gap 26. The "N"-"S" orientation of magnet 104 may be reversed. Hermetic enclosure 102 is fixed by any convenient means to spring base 20.

Optical scale 110 is attached to an end of magnet 104 such that when magnet 104 moves in response to motion of portion 22A, that a different portion of scale 110 is intercepted by light beam 112 of optical emitter-detector 114. Emitter-detector 114 is similar to emitter-detector 34 of FIG. 1 or emitter-detector 90 of FIG. 2. While scale 110 is shown as being mounted on the "S" end of magnet 104, it could also be mounted on the "N" end of magnet 104. As magnet 104 moves as shown by arrows 116 in response to motion 30 of portion 22A, the electrical signal provided by the optical detector of emitter-detector 114 varies, thereby providing information about the instantaneous position of magnet 104 and portion 22A in the same way as previously described in connection with the arrangements of FIGS. 1-4.

FIG. 6 is a partially cut-away side view of a still further embodiment, similar to that in FIG. 5, but with a different shaped magnet. In FIG. 6, sensor 120 comprises "horseshoe" shaped magnet 122 supported by means 123 on rotating pivot or fibre 124. When portion 22A moves in directions 30, magnet 122 rotates as shown by arrows 126. Optical emitter-detector 114 provides a light beam 112 intersecting, for example, optical scale 128 similar to optical scale 110 of FIG. 5 mounted on the rear face of magnet 122. Other than the shape of magnet 122 and its associated magnetic field, sensor 120 of FIG. 6 functions in a similar way as sensor 110 of FIG. 5.

The arrangements of FIGS. 5 and 6 differ from those of FIGS. 1-2 in that there is no stator to provide a low impedance magnetic return path. Nevertheless, it has been found that magnets 104 or 122 follow the motion of portion 22A quite well. It is necessary that portion 22A be ferromagnetic in order to concentrate the flux lines from magnet 104 or 122 across gap 26. The greater the flux density in the vicinity of portion 22A, the greater the mutually attractive force causing magnetic armatures 104 or 122 to follow motion 30 of portion 22A. in FIG. 5, the magnetic flux extends from the (e.g. "N") pole of magnetic armature 104 across air gap 26 into ferromagnetic portion 22A of spring 20, and returns to the opposite (e.g., "S") pole of magnet 104 generally through the surrounding space. Hermetic enclosure 102 (or at least wall 108 thereof) is desirably not ferromagnetic.

In FIG. 6, the horseshoe shape of magnet 122 locates the tips of the "N" and "S" poles in close proximity. Even though the poles of magnet 122 are close together, there is a substantial fringing field that extends through wall 108 and across gap 26 to intersect portion 22A of spring 20. It is this fringing field that provides the magnetic attraction which causes magnet 122 to rotate in direction 126 in response to motion of region 22A in direction 30. The large fringing field is obtained by having the pole regions of magnet 122 tapered so that, where the pole regions face each other, they have a much smaller cross-section than the average cross-section of the balance of the magnet. This causes the field between the poles to spread laterally to a much greater extent than if the poles faces had the same cross-section as the balance of the magnet. FIG. 6 shows a preferred shape for the pole regions of magnet 122, but other pole shapes which promote extension of a strong fringing field through wall 108 and across gap 26 to ferromagnetic portion 22A, are also useful.

FIG. 7-8 illustrate reflective and/or transmissive optical scales which may be used in conjunction with the armatures to facilitate optical detection of the position and motion of the armature. In FIG. 7, optical scale 130 has tapered opaque or non-reflective patterns 132 oriented substantially parallel to the direction of relative motion (shown by arrows 134) of light beam 138. Light beam 138 is shown in FIG. 7 as a stippled circle so that it may be distinguished from patterns 132. As beam 138 moves left or right along optical scale 130, the amount of light reflected from or transmitted by scale 130 varies continuously with the relative position of scale 130 and beam 138. The reflected light is lower to the left and higher to the right, while the transmitted light is opposite. The magnitude of the reflected or transmitted light is proportional to the absolute instantaneous relative position of scale 130 and beam 138. The transmitted or reflected light is measured by the optical detector and converted into an electrical signal. This electrical signal may be processed to obtain further electrical outputs proportional to the relative velocity and acceleration of scale 130 and light beam 138.

FIG. 8 shows further optical scale 140 for measuring the relative position and motion of the armature and therefore the object whose position and motion is being sensed. Scale 140 may be either transmissive or reflective and consists of two related scales 142, 154 which move as a unit. In the embodiment shown in FIG. 8, first scale 142 comprises four regions of different optical density 146, 148, 150, 152. Second scale 154 has four sub-regions 156, 158, 160, 162, each of which has four regions of differing optical density like regions 146, 148, 150, 152.

Scale 142 is intersected by slot shaped light beam 164 and scale 154 is intersected by slot shaped light beam 166 whose reflection (or transmission) are detected by separate detectors (not shown). Light beams 164 and 166 may be a single beam extending across scales 142 and 154 with the reflection (or transmission) from scales 142 and 154 being observed by different detectors.

As scale 140 and light beams 164, 166 move relative to each other in the direction shown by arrows 168, the amplitude of the reflected (or transmitted) beams varies according to the optical density of the portion of the scale under the beams 164, 166. The scale shown in FIG. 8 provides sixteen distinguishable quantized light output levels, depending upon the relative position of scale 140 and light beams 164, 166. The number of quantized levels may be increased or decreased by increasing or decreasing the number of regions and sub-regions of different optical density. Those of skill in the art will understand how this may be accomplished based on the description herein.

In a further embodiment, the slot-shaped light beams 164, 166 are replaced by one or more small (e.g., circular) beams 164', 166' which are scanned in direction 167 at substantially right angles to direction 168. This provides an AC or pulsed output wherein the signals from the detectors pointed at scales 142 and 154 vary or pulse according to the scan frequency and periodicity of the optical scale which beams 164', 166' are traversing. The relative time durations of the high and low amplitude reflected (or transmitted) optical and/or electrical output signals identify the portion of the optical scale being scanned, and therefor the relative position of the scale and the light beam or beams. A similar scanning procedure may be applied to the arrangement of FIG. 7 by providing smaller diameter light beam 138' and scanning it across scale 130 in direction 139 substantially perpendicular to direction 134.

The relative duration (e.g., pulse width) of the high and low reflected (or transmitted) optical signal, and corresponding high-low electrical signals from the optical detector, determine the relative position of the scanned light beam along the scale in either FIG. 7 or FIG. 8, independent of slow variations in light emitter output or detector sensitivity due to temperature change or other conditions. Thus, inexpensive digital signal processing techniques and components may be readily employed to determine instantaneous position, velocity and acceleration with great precision. This is a great convenience. Further, the output may be easily made compatible with other digital electronic systems increasingly used in vehicles, as for example, for vehicle height and/or ride control. Many other means and methods well known in the art for modulating the optical signals as a function of position and/or motion of the armature may also be used.

Figure 9:
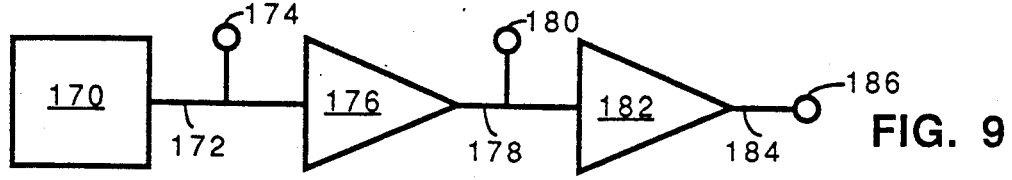
FIG. 9 is an electrical schematic drawing indicating how the electrical signal(s) from the optical receiver(s) may be conveniently processed to obtain information related to position, velocity and acceleration.

FIG. 9 shows in schematic form how analog electrical signal(s) obtained from the optical receivers are processed to provide position, velocity and acceleration information concerning the armature, and therefore the object whose position and motion is being detected. Optical detector 170 provides electrical output 172 to first differentiator 176. Electrical output 172 may be separately observed at terminal 174 and provides a signal proportional to the instantaneous position of portion 22A or equivalent object. A phototransistor is an example of a convenient optical detector.

Differentiator 176 provides output 178 proportional to the first differential of input signal 172 and therefore proportional to the velocity of portion of object 22A. Output 178 may be separately observed at terminal 180. First differentiator output signal 178 is fed into second differentiator 182, which in turn provides second differentiated output 184 at terminal 186. Second differentiated output 184 is proportional to the acceleration of portion or object 22A. Means and methods for providing first and second differentiators using conventional integrated circuits and other components are well known in the art. Other means well known in the art for extracting the same or equivalent information from the analog or digital electrical signals derived from the optical detector(s) may also be used.

Based on the foregoing description, it will be apparent to those of skill in the art that the present invention provides an improved position/motion sensor which is hermetically sealed and which does not require moving parts penetrating the hermetic enclosure. By virtue of its magnetic coupling and optical detection, the sensor can be sealed against dust, dirt, moisture, corrosive liquids and other adverse ambient contaminants, particularly those found in vehicle applications. The sensor is comparatively inexpensive to construct and uses, in general, commonly available materials and components.

While the present invention has been described in terms of particular embodiments, these are for purposes of explanation and not intended to be limiting. Those of skill in the art will appreciate based on the description herein that many variations may be made on the arrangement and implementation of the various portions of the invention without departing from the spirit and scope thereof. For example, among other things, the optical path is shown as impinging on the narrow side of armature 78 in FIG. 2. However, the optical path could also impinge on the broad face or faces of armature 78 through additional slots provided for that purpose in stator 72. Similarly, rather than having the light path impinge on the circumference of armature 14 in FIG. 1, it could impinge on the faces of armature 14 perpendicular to axle 16. Similar variations may be made in connection with the embodiments shown in FIGS. 5 and 6.

Further, while the optical scales and emitter-detector positioning shown in FIGS. 1-2 and 5-6 illustrate reflective arrangements, those of skill in the art will understand based on the description herein that transmissive arrangements could also be used. For example, in FIG. 2, emitter 92 may be located adjacent wall 82 so that light beams 93, 95 extend from left to right and pass through a partially transparent optical scale attached to armature 78 outside stator 73, 75 to provide continuing transmitted beams 97, 99 extending to detectors 94, 96. The same result is obtained.

Based on the description herein, persons of skill in the art will understand how to choose the particular arrangement of these and other elements of the invention which best suits their particular requirements.

It is intended to include these and such other variations as will occur to those of skill in the art based on the description herein in the claims that follow.

I claim:

1. A device for detecting motion of one portion of an apparatus with respect to another portion of the apparatus, comprising:
   a stator constructed of ferromagnetic material;
   a substantially sealed housing enclosing at least a portion of the stator and attached to the another portion of the apparatus by the stator;
   a magnet;
   an armature of ferromagnetic material enclosed within the substantially sealed housing and magnetically coupled to the one portion of the apparatus by means of a magnetic circuit including the apparatus, the stator, the magnet and the armature, the armature being moveably mounted and responsive to motion of the one portion of the apparatus with respect to the another portion; and
   an optical detector including a light emitter and a light sensor forming a light path extending within the substantially sealed housing, the light path further including a portion of the armature designed to change the amount of light in the light path in response to movement of the armature for sensing a change in position of the armature and the one portion of the apparatus with respect to the another portion.

2. The device of claim 1 including a partially transparent region interposed between the light emitter and the light sensor, in the light path, which transparent region moves in response to motion of the armature so that the amount of light transmitted from the emitter to the sensor varies with motion of the armature.

3. The device of claim 2 wherein the partially transparent region comprises successive opaque and transparent regions arranged so that motion of the armature produces a quantized or digitally encoded signal from the optical sensor.

4. The device of claim 3 wherein the armature is mounted on a spring for holding the armature in a predetermined position.

5. The device of claim 4 wherein the armature moves in substantially the same plane as motion of the one portion of the apparatus.

6. The device of claim 1 wherein the magnet is constructed as a part of the armature.

7. A device for detecting motion of a vehicle comprising:
   a first portion and a second portion of the vehicle, the second portion being moveable with respect to the first portion, the first and second portions being at least partially constructed of ferromagnetic material;
   a stator constructed of ferromagnetic material;
   a substantially sealed housing enclosing at least a portion of the stator and attached to the first portion of the vehicle by the stator;
   a magnet;
   an armature of ferromagnetic material enclosed within the substantially sealed housing and magnetically coupled to the second portion of the vehicle by means of a magnetic circuit including the first and second portions, the stator, the magnet and the armature, the armature being moveably mounted and responsive to motion of the second portion of the vehicle; and an optical detector including a light emitter and a light sensor forming a light path extending within the substantially sealed housing, the light path further including a portion of the armature designed to change the amount of light in the light path in response to movement of the armature for sensing a change in position of the armature as a result of movement of the second portion of the vehicle relative to the first portion.

8. A device as claimed in claim 7 wherein the first and second portions of the vehicle are a spring and axle.

9. A device as claimed in claim 7 wherein the first and second portions of the vehicle are the inner and outer telescoping portions of a shock absorber.

* * * * *